LOW LOSS ARRANGEMENT FOR CONVERSION OF FREQUENCY BANDS, UTILIZING A SWITCHING CIRCUIT

Filed Feb. 23, 1961

United States Patent Office 3,205,310

Patented Sept. 7, 1965

3,205,310

LOW LOSS ARRANGEMENT FOR CONVERSION OF FREQUENCY BANDS, UTILIZING A SWITCHING CIRCUIT

Max Schlichte, Munich, Germany, assignor to Siemens & Halske Aktiengesellschaft, Berlin and Munich, a German corporation Filed Feb. 23, 1961, Ser. No. 91,233

Claims priority, application Germany, Mar. 8, 1960, S 67,471

6 Claims. (Cl. 179—15)

This invention relates to the conversion of frequency bands. The various objects and features of the invention will be better understood upon considering the following antecedents.

In communication systems which operate in accordance with the time multiplex principle, a plurality of communication channels are grouped on a common multiplex line. The distribution and transmission of the individual messages are effected by connecting the individual connection paths to the multiplex line over periodically operated switches. The actuation of these switches is controlled so that only one connection is at any time switched through, that is, only the two switches are momentarily closed over which the corresponding message is respectively supplied and transmitted. The system may be used for two-way operation.

The problem of damping is of considerable importance because the messages are subjected to impulse-wise sampling. Energy losses occasioned by the sampling, which would make the transmission system uneconomical, must therefore be avoided. In accordance with a known system, excessive damping is avoided by supplying the respective switches each over transverse capacitances interconnected with a longitudinal inductance and circuiting these elements in view of the duration of the switching so that an exchange of the charges on the capacitors forming the capacitances is effected in closed position of a switch, such exchange taking place in the form of a half oscillation. The energy on one capacitor is in this manner switched over to the other capacitor, during the closure interval of the corresponding switch, thereby effecting an exchange of the total available energy. This operation can be effected in both transmission directions.

The present invention utilizes the above indicated switching circuit in which a periodically actuated switch connects two capacitances in series with an inductance. The invention provides means in conjunction with such switching circuit, forming an arrangement therewith which permits coversion or reformation of frequency bands with respect to the frequency position thereof. This is according to the invention achieved by providing on both sides of such switching circuit band filters the respective pass range of which coincides with a side band of the frequency spectrum which appears upon sampling the frequency band which is to be converted.

The various objects and features of the invention will now be described with reference to the accompanying drawing.

Figure 1:
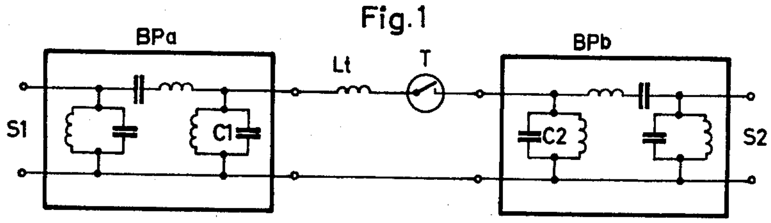
FIG. 1 shows a circuit constructed in accordance with the principles noted above.

The circuit shown in FIG. 1 comprises a periodically actuated switch T, which may be suitably constructed, for example, as a diode or as a transistor switch, such switch being serially connected with an inductance L*t*. At each side of this arrangement is disposed a band pass filter respectively indicated by BP*a* and BP*b*. The capacitors C1 and C2 of these band pass filters form with the inductance L*t* an oscillating circuit in which is upon closure of the switch T effected the previously mentioned interchange of the charges in the form of a half oscillation. The switching circuit previously referred to is formed by the capacitors C1 and C2, the inductance L*t* and the switch T, the capacitors C1 and C2 also forming parts of the respective band pass filters connected to the switching circuit.

Figure 2:
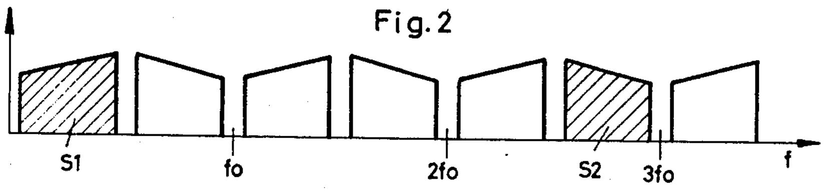
FIG. 2 represents in the form of a diagram the frequency spectrum appearing upon sampling a frequency band which is to be converted.

The two band pass filters BP*a* and BP*b* are constructed so that they respectively pass a side band of the frequency spectrum, which appears upon the sampling of the frequency band which is to be converted. Such a frequency spectrum is shown in FIG. 2 in the form of a diagram. The diagram shows on each side of the sampling frequency *fo* and its harmonic oscillations 2*fo*, 3*fo* . . . a side band, such side bands being produced from the frequency band S1 by sampling with the sampling frequency *fo*.

The frequency bands represented in FIG. 2 can now be mutually converted, one into the other, by the circuit arrangement according to the invention as described with reference to FIG. 1. For example, if the frequency band S1 is conducted to the appropriately tuned band pass filter BP*a* and, assuming that the band pass filter BP*b* is tuned to the frequency band S2, and further assuming that the switch T effects, in cooperation with the inductance L*t* and the capacitors C1 and C2, the described interchange of the charges, there will appear the frequency band S2 at the output of the band pass filter BP*b*. A fresuency conversion will analogously result upon conducting to the circuit in opposite direction the frequency band S2, in which case the frequency band S1 will appear at the band pass filter BP*a*. It is in particular possible to effect this conversion in both directions simultaneously, as is required for two-wire connections.

In the above described example, a band has been selected for the frequency band S1, which is on one side practically contiguous to the frequency O. Accordingly, in an actual case of use, there would be provided in place of the band pass filter BP*a* a low pass filter, which however likewise constitutes a band pass filter so far as its principle is concerned. In the event that other frequency bands are to be transmitted and converted, from the frequency spectrum shown in FIG. 2, appropriately tuned band pass filters are to be provided in the circuit according to FIG. 1.

Figure 3:
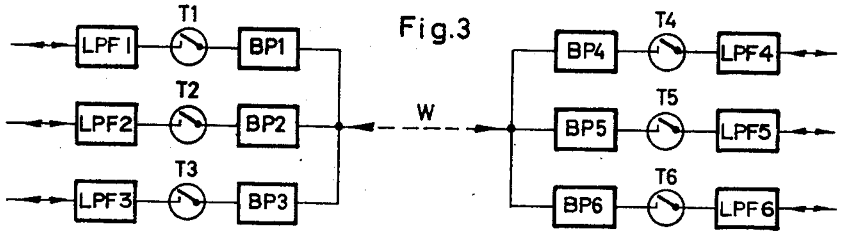
FIG. 3 illustrates an example of using the conversion principle of the invention in the bundling of a plurality of message channels in a common transmission path.

The above described conversion principle is advantageously adapted for grouping a plurality of different messages in a common transmission path. An example of such grouping is shown in FIG. 3, in which three low frequency communication channels are combined in a common transmission path W, also permitting two-way communication. The low frequency channels feed in one transmission direction the low pass filters LPF1, LPF2, LPF3, which are respectively serially connected each with a switching circuit of the previously described kind, only the switches T1, T2 and T3 of such switching circuits being shown. These switches sample the frequency band respectively conducted thereto, in identical rhythm, thus making it possible to operate with a common impulse source. It is, however, also possible to provide for each switch T1–T3 an individual sampling frequency. Care must be taken in such case that no side bands appear in the sampling of the individual frequency bands, which overlie two side bands of one of the other frequency spectrums. For example, the frequency spectrum produced by the switch T1 must not have any side bands which overlie two side bands of the frequency spectrums delivered by the switches T2 and T3. This rule is automatically complied with when the three switches T1 to T3 operate with the same sampling frequency and when individual frequency bands are conducted to the low pass filters LPF1 to LPF3. The band pass filters BP1, BP2, BP3 filter from the respective frequency spectrums always a single band and to the transmission line W are accordingly supplied three bands which do not overlap. The three bands are thus transmitted without mutual interference and are at the receiver side separated by filtering out the individual transmitted bands from the incoming frequency mixture, by means of band pass filters BP4, BP5 and BP6. These latter band pass filters feed into the switches T4, T5 and T6 forming respectively parts of switching circuits described before. The switches T4 to T6 are respectively serially connected with low pass filters LPF4, LPF5, LPF6 from which are obtained the respective originally supplied low frequency bands.

The operation of the circuit according to FIG. 3 shall now be explained with reference to a numerical example. It shall be assumed that the frequency bands 0 to 3.4 kilocycles are conducted to the low pass filters LPF1 to LPF3 and that the sampling by means of the switches T1 to T3 is effected with a sampling frequency of 10 kilocycles. The band pass filters BP1, BP2, BP3 successively filter out, from the frequency spectrums produced, the frequency bands 6.6 to 10 kilocycles, 16.6 to 20 kilocycles and 26.6 to 30 kilocycles. These frequency bands are respectively individually transmitted from the band pass filters BP4 to BP6, so that each of the switches T4, T5 and T6 receives one of the converted frequency bands which are thereupon reconverted to the original position by the cooperation of these switches with the low pass filters LPF4 to LPF6.

Owing to the symmetrical construction, the circuit operates in similar manner in opposite direction. It is also possible to use the circuit simultaneously in both directions, that is, in the so-called two-wire operation.

The invention may be particularly advantageously applied in connection with communication systems which operate in accordance with the initially mentioned time multiplex principle. The invention meets the requirement in such systems, that the individual communication channels are sampled. The switching circuits provided in such systems are accordingly suitably combined with appropriate band pass filters.

Figure 4:
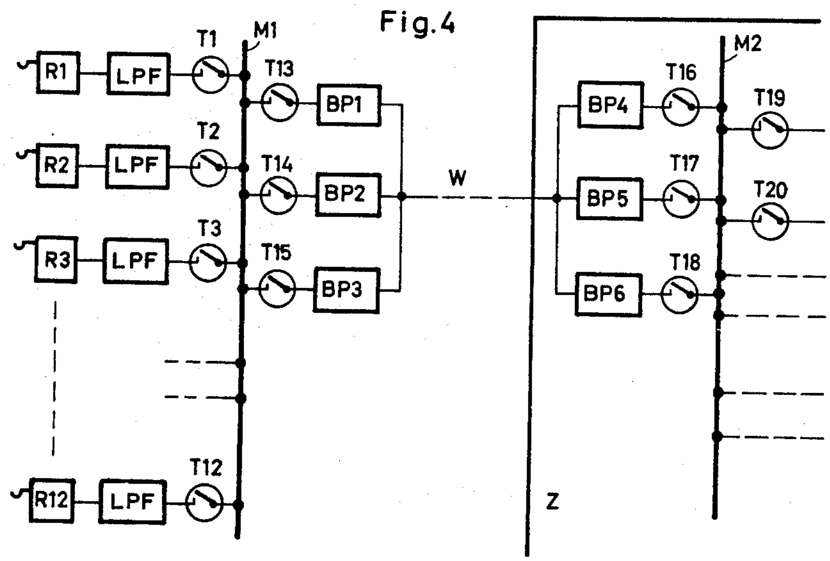
FIG. 4 shows the use of the invention in connection with a time multiplex system.

An example of such use will now be described with reference to FIG. 4 showing part of a time multiplex system. To a central exchange Z of the communication system are connected subscriber stations some of which are indicated at R1 to R12. These subscribers belong to a group which is connected with the exchange over a common line W. An arrangement of this kind is particularly indicated when the corresponding subscriber group is located far from the central exchange, because considerable savings can in such case be effected with respect to cables. The connection paths extending to and from the subscribers are combined according to the principles of the present invention. A further saving is effected with respect to channels since only a part of the subscribers R1–R12 are at any time involved in calls. The saving is effected as follows:

There are twelve subscribers connected to a multiplex line M1 over low pass filters TP and switches (switching circuits) T1 to T12. At the most three of the switches T1 to T12 can be operatively actuated at any time and, accordingly, not more than three subscribers can be simultaneously involved in calls. The corresponding switches are thereby actuated with the same sampling frequency but with different phase position. A total of three phase positions are available for this purpose. This connection of the subscribers to the multiplex line M1 is effected in accordance with known operations employed in time multiplex systems. The three possible connections within a subscriber group are in this way combined on the multiplex line M1. The further extension of the individual connections takes place over further three switches T13, T14, T15, to each of which is assigned one of the three given phase positions. These switches are respectively serially connected with band pass filters BP1, BP2, BP3 each of which is operative to filter out an individual side band from the frequency spectrum produced by the respectively cooperating switch, such filtered out frequency bands being combined on the transmission line W. The latter transmits the three channels without mutual interference to the central exchange Z where they are correspondingly forked to the band pass filters BP4, BP5, BP6. The switches T16, T17, T18 effect the connections to the multiplex line M2 on which the messages appear again as they were on the multiplex line M1. It is to be observed thereby that the switches T16 to T18 are operated with substantially the same sampling frequency as applied in connection with the switches T13 to T15. A deviation from the sampling frequency will result in a corresponding frequency shifting. The further transmission extending from the multiplex line M2 is effected over further switches T19, T20, etc., in accordance with operations customary in connection with time multiplex systems. Each of the switches T1 to T20, etc., is a part of a previously explained switching circuit. It is of course understood that the circuit according to FIG. 4 may be employed for transmission in two-way operation.

The advantages of the circuit arrangement according to FIG. 4 will be apparent upon considering the following features:

Keeping in mind the ever increasing tendency of combining subscriber groups outside of the exchanges, it will be found that the application of the principles according to the invention will require as an additional expenditure the use of band pass filters instead of low pass filters which would otherwise be necessary. This additional expenditure is relatively small as compared with the gain that is obtained thereby, namely, the saving of trunk lines between the subscriber groups and the central exchange such as the exchange Z, which otherwise would be necessary. The use of the customary low pass flters, in place of the band pass filters according to the invention, would require three separate trunk lines while one single trunk line suffices when applying the principles according to the invention.

Changes may be made within the scope and spirit of the appended claims which define what is believed to be new and desired to have protected by Letters Patent.

I claim:

1. A circuit arrangement for converting frequency bands utilizing a switching circuit containing a periodically actuated sampling switch, first capacitance means, inductance means connected between said first capacitance means and one side of said switch, second capacitance means connected between the opposite side of said switch and said first capacitance means, means for applying the frequency band which is to be converted to charge said first capacitance means, and means for opening and closing said sampling switch at each half cycle of the resonant frequency of said circuit to transfer the charge from said first capacitance means to said second capacitance means, comprising on each side of said switching circuit a band pass filter the pass range of which coincides with a side band of a frequency spectrum which appears upon sampling, by said sampling switch, of the frequency band to be converted, the respective filters at one side of said switching circuit having a frequency position different from that of the corresponding filters at the opposite side of said switching circuit.

2. A circuit arrangement according to claim 1, comprising a plurality of conversion circuits which are repectively provided with band pass filters and switching circuits, each band pass filter having a different frequency position, means for connecting said conversion circuits to one end of a common transmission path, and means for connecting to the other end of said transmission path similarly constructed conversion circuits having respective band pass filters of different frequency position, each of which has a frequency position corresponding to that of a respective filter of said first mentioned conversion circuit.

3. A circuit arrangement according to claim 1, wherein said capacitive means are part of the respective band pass filters.

4. A circuit arrangement according to claim 1, wherein said capacitive means are part of the respective band pass filters, comprising a plurality of conversion circuits which are respectively provided with band pass filters and switching circuits, means for connecting said conversion circuits to one end of a common transmission path, and means for connecting to the other end of said transmission path similarly constructed conversion circuits.

5. A circuit arrangement according to claim 1, for effecting connections between a subscriber group and an exchange of a time multiplex communication system, wherein the individual subscribers of a group are connected to a multiplex line over low pass filters and periodically actuated switches, further periodically actuated switches connected respectively with band pass filters extending from said multiplex line to a common trunk line which extends to the exchange, similar band pass filters connected to the trunk line in the exchange and in turn connected with periodically actuated switches extending to a further multiplex line in the exchange, the respective switches forming parts of switching circuits.

6. A circuit arrangement according to claim 1, wherein said capacitors are part of the respective band pass filters, for effecting connections between a subscriber group and an exchange of a time multiplex communication system, wherein the individual subscribers of a group are connected to a multiplex line over low pass filters and periodically actuated switches, further periodically actuated switches connected respectively with band pass filters extending from said multiplex line to a common trunk line which extends to the exchange, similar band pass filters connected to the trunk line in the exchange and in turn connected with periodically actuated switches extending to a further multiplex line in the exchange, the respective switches forming parts of switching circuits.

References Cited by the Examiner

UNITED STATES PATENTS

| | | | |
|---|---|---|---|
| 2,936,337 | 5/60 | Lewis | 179—15 |
| 2,936,338 | 5/60 | James | 179—15 |
| 3,062,919 | 11/62 | Jacob | 179—15 |

FOREIGN PATENTS

| | | |
|---|---|---|
| 218,043 | 5/57 | Australia. |
| 824,222 | 6/57 | Great Britain. |

DAVID G. REDINBAUGH, *Primary Examiner.*

L. MILLER ANDRUS, *Examiner.*